United States Patent [19]

Andersson

[11] Patent Number: 4,674,700
[45] Date of Patent: Jun. 23, 1987

[54] RETRACTOR REEL FOR A VEHICLE SAFETY BELT
[75] Inventor: Tommy Andersson, Alingsas, Sweden
[73] Assignee: Autoliv Development AB, Vargarda, Sweden
[21] Appl. No.: 773,139
[22] Filed: Sep. 6, 1985
[30] Foreign Application Priority Data
  Sep. 12, 1984 [SE] Sweden .................... 8404581
[51] Int. Cl.⁴ .............................................. B60R 22/36
[52] U.S. Cl. .............................................. 242/107.4 R
[58] Field of Search ............... 242/107.4 C, 107.4 A, 242/107.4 R, 107; 280/806; 297/478

[56] References Cited
U.S. PATENT DOCUMENTS
  4,223,853  9/1980  Ernst ........................ 242/107.4 R
  4,509,707  4/1985  Ernst et al. ............... 242/107.4 C X FOREIGN PATENT DOCUMENTS
  2646238  4/1978  Fed. Rep. of Germany .
  407335   3/1979  Sweden .
  2026305  2/1980  United Kingdom .
  2026847  2/1980  United Kingdom ........ 242/107.4 A Primary Examiner—John M. Jillions
Attorney, Agent, or Firm—Spencer & Frank

[57] ABSTRACT

A retractor reel for vehicle safety belts of the type in which the belt is automatically wound onto a rotatably supported shaft, when the belt is not used, comprises a first locking means and a second locking means, one of which being attached to the support and the other being attached to the rotatable shaft. One of the locking means is movable and arranged to be moved between an idle position, in which it does not engage with the other locking means, and an operative position, in which it engages with the other locking means for locking the shaft. The two locking means are positioned at one end of the rotatable shaft, and two further locking means are positioned at the opposite end of the shaft, where the shaft is supported by a bearing which is arranged to yield, when the shaft is heavily loaded. When the bearing yields, the two further locking means will engage with each other to lock the end of the shaft, so that the shaft will be locked at both ends when heavily loaded. This will increase the strength of the support.

12 Claims, 3 Drawing Figures

RETRACTOR REEL FOR A VEHICLE SAFETY BELT

BACKGROUND OF THE INVENTION

The present invention is related to a retractor reel for vehicle safety belts, and particularly for safety belts in motor cars, of the type in which the belt is automatically wound onto a shaft rotatably supported by at least one bearing at each end, when the belt is not used, the bearings being positioned in opposite walls of a support carrying the safety belt. The retractor reel device comprises a first locking means and a second locking means to co-operate and engage with the first locking means. One of the locking means is attached to the support and the other is attached to the rotatable shaft. One of the locking means is movable and arranged to be moved between an idle position, in which the locking means does not engage with the other locking means, and an operative position, in which the locking means engages with the other locking means for locking the shaft.

Retractor reels of the type set forth above are known. These prior art devices have been provided with locking means either only at one end or at both ends of the rotatable shaft. In the first case, with a single-ended locking of the rotatable shaft the locking means are lighter and more accurate in operation, so that the desired limit values for the on and off operation of the locking means can be achieved with a comparatively high accuracy. On the other hand, the strength of the construction is low, because the support is unevenly loaded when a heavy load occurs on the strap of the safety belt, so that the support may be deformed and there is a risk that the shaft may slip out of its bearings, thus releasing the belt as opposed to locking it. Therefore, the parts of the support forming the locking device must be comparatively generously proportioned to be able to take up the loads that arise without any risk of deformation. In the second case, with a double-ended locking of the rotatable shaft the locking means are heavier and more difficult to guide to an accurate operation. Therefore, it is frequently difficult to achieve the desired operation at the desired limit values with these devices. However, in these constructions a more even loading of the support is obtained, so that the necessary strength can be obtained with a weaker design ofthe support parts.

Furthermore, it is previously known, for example from British Patent Specification No. 2,026,305, to use two bearings at each end of the rotatable shaft, one bearing consisting of two bearing means having a low friction and a comparatively low strength and the other bearing consisting of two bearing means having a high strength but lacking the precision necessary for a silent running and a low friction. The first bearing is in operation in normal running and provides a silent running and a low friction during extraction and retraction of the strap. The second bearing is used only in case of a very high loading of the safety belt, for example in a collision, and will take up forces that arise, because the first bearing will yield in such a case. In this prior art design a double-ended locking is used.

It is also previously known, for example from Swedish Patent Application No. 7711192-0, to mount the rotatable shaft on pivoted arms, so that the shaft when loaded can be moved to engagement with fixed locking means for locking the shaft. In this case, however, the complete shaft must be mounted movably in the support which makes the construction complicated and expensive.

OBJECT OF THE INVENTION

The main object of the invention is to provide a retractor reel having an improved strength when the safety belt is heavily loaded, for example in an accident, by means of comparatively light locking means which are easy to guide. According to the invention, this object is achieved by giving the locking device the features set forth in the claims.

Due to the fact that the rotatable shaft is provided with locking means for normal locking of the shaft at one end only and with further locking means operating only in case of accidents or near-accidents at the opposite end, the advantages of the single-ended and the double-ended locking methods set forth above can be combined.

SUMMARY OF THE INVENTION

According to this invention there is provided a retractor reel for a vehicle safety belt comprising a shaft with two ends, two bearings, each bearing rotatably supporting a respective end of the shaft, a support having two opposed walls, the bearings being mounted on said walls, means for automatically winding the belt onto the shaft when the belt is not in use, a first locking means and a second co-operating locking means, one of the locking means being attached to the support and the other being attached to the rotatable shaft, one of the locking means being movable and arranged to be moved between an idle position, in which it does not engage with the other locking means, and an operative position, in which it engages with the other locking means for locking the shaft, the two locking means being positioned at one end of the rotatable shaft; the shaft bearing at the opposite end of the shaft to the locking means is adapted to yield, when the shaft is heavily loaded; two further locking means being positioned adjacent the yieldable bearing and arranged to engage with each other to lock the shaft end, when the shaft bearing at this end yields, with the result of that the shaft will become locked at both ends when heavily loaded.

This provides an improved locking effect when an accident occurs.

Preferably the further locking means are each provided with teeth, the teeth being arranged to be able to engage with each other, to lock the shaft and, one of the further locking means being on the rotatable shaft and the other further locking means being on the support.

Conveniently one of the further locking means consists of a toothed wheel on the rotatable shaft, and the other further locking means consists of at least one tooth positioned just outside the periphery of the tooth wheel on the side of the shaft, where the belt is withdrawn from the shaft.

Preferably the toothed wheel on the shaft is positioned in an opening in a wall of the support and lies substantially in the same plane as the wall.

Advantageously the yieldable bearing is positioned on a resilient cover mounted on the support and the bearing penetrates into the end of the rotatable shaft.

In an alternative embodiment the yieldable bearing comprises at least one plastic ring which surrounds the end of the rotatable shaft and which is adapted to yield, when the shaft is heavily loaded.

Preferably the yieldable bearing comprises two plastic rings, one of which is positioned on the support wall and the other is positioned on the rotatable shaft, and that the further locking means are embedded in the plastic rings, which are arranged to break, when the shaft is heavily loaded.

Conveniently the support wall is planar and the plastic rings are positioned substantially in the same plane as the wall.

Preferably only the bearing positioned adjacent the further locking means is yieldable.

DESCRIPTION OF PREFERRED EMBODIMENTS

Figure 1:
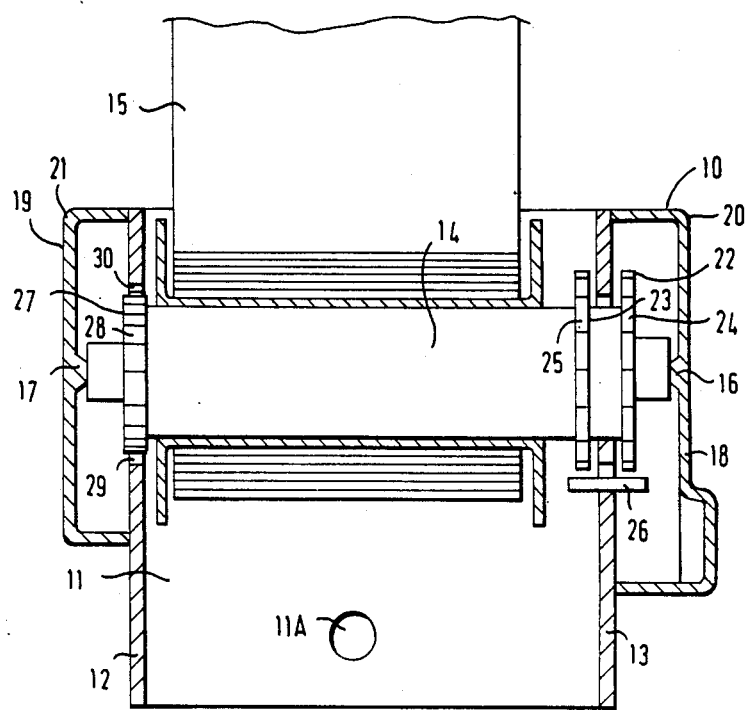
FIG. 1 is a cross section through a first embodiment retractor reel for a safety belt in accordance with the invention having a shaft to receive the strap of the belt and a locking device for the shaft, the shaft being supported in bearings in its end surfaces.

A retractor reel for a safety belt shown in FIG. 1, comprises a support 10 comprising a base plate 11 having a role 11A for a mounting screw and two parallel spaced apart side walls 12, 13. A shaft 14 onto which may be wound a strap 15 of a safety belt is rotatably supported by two bearings 16, 17 arranged on two walls 18, 19 of end covers 20, 21 mounted on the support 10. Each bearing engages and supports one end of the shaft. The bearings 16, 17 each consist of an inwardly directed conical projection, formed integrally with the respective end cover, which is preferably made of a plastic material. Each conical projection is directed into a respective conical depression formed in the adjacent end of the shaft. The end covers 20, 21 surround the shaft ends, and the cover 21 also surrounds a helical spring, not shown, for automatically coiling the strap onto the shaft, when the belt is not used. The end covers 20, 21 are made of a material which is slightly resilient, for purposes that will become clear from the following description. The shaft 14 passes through an aperture in the side wall 13. This region of the shaft is provided with two wheels 22, 23 rigidly attached to the shaft. The wheels are each provided with a number of teeth at their rims and are arranged on either side of the side wall 13. The toothed wheels 22, 23 are adapted to co-operate with a locking bar 26 which can be moved to lock the shaft to prevent the withdrawal of the belt. The locking bar extends through the side wall 13, through an appropriate aperture. The locking bar is movable between an idle position, in which the bar does not project into the path traversed by the teeth of the toothed wheels 22, 23, and an operative position, in which the bar enters into the path traversed by the teeth. The toothed wheels apply a force to the locking bar, but the bar cannot move since it is retained in its aperture in the wall 13. Thus the locking bar 26 locks the shaft 14. The locking bar can be guided to the idle position or to the operative position by means of a control disk, not shown, arranged on the shaft (or concentrically with the shaft) in such a way that the shaft can rotate without driving the control disk. The control disk can be turned in relation to the locking bar, so that the locking bar is moved between the different positions. The turning of the control disk necessary to effect locking of the shaft can be effected by controllably or selectively connecting the disk to the shaft, so that the disk is forced to rotate with the shaft. This connection can be provided either by means of an inertia wheel rotatably mounted on the shaft, the interia wheel being actuated in response to a rapid extraction of the strap, or by means of a separate inertia means actuated in response to movements of the vehicle such as rapid acceleration or decelleration. Such connecting means are previously known, for example through the U.S. Pat. No. 4,167,254, and have not been described in detail here for this reason.

Figure 2:
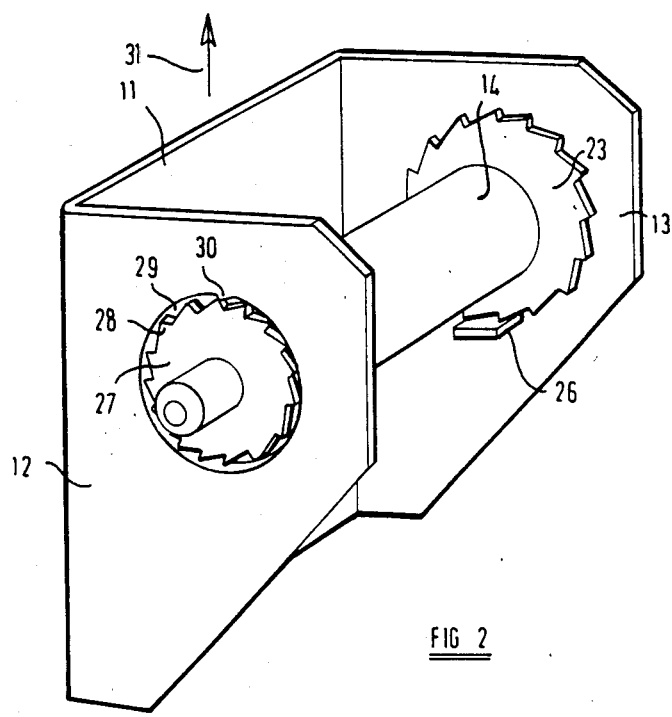
FIG. 2 is a schematic perspective view illustrating the locking device in the embodiment shown in FIG. 1.

The retractor reel is also provided with a wheel 27 which is rigidly attached to the shaft 14 at the end thereof remote from the wheels 22, 23. The wheel 27 rotates with the shaft. The wheel 27 is provided with teeth 28 along its rim. The toothed wheel 27 is positioned in an opening 29 in the side wall 12 and lies in the plane of the side wall. The side wall 12 is provided with a tooth 30 projecting into the opening 29 towards the path traversed by the teeth 28 on the wheel 27, as clearly shown in FIG. 2. For the sake of clarity, in FIG. 2 the shaft 14 is shown without the coiled strap 15, but the strap is intended to be withdrawn from the shaft in the direction indicated by the arrow 31. The tooth 30 is positioned outside the periphery of the toothed wheel 27 on the side of the shaft 14 where the strap is withdrawn from the shaft. The teeth 28 on the wheel 27 and the tooth 30 on the side wall 12 are designed and arranged to co-operate to lock the shaft in a way which is to be explained more in detail below.

The described retractor reel operates in the following way. During normal use of the safety belt the shaft 14 is free to rotate, permitting withdrawal of the belt, but the shaft is locking in response to a rapid extraction of the strap and/or rapid accelleration or decelleration of the vehicle. The locking is provided only by moving the locking bar 26 to its operative position, i.e., into engagement with the locking teeth 24, 25 on the wheels 22, 23. Assuming that the load exerted by the strap is moderate, the load will be carried substantially by the side wall 13. When the situation that has caused the locking of the shaft has ended, the shaft can again rotate on the bearings 16, 17.

In an emergency, for example in a collision, the load in the strap will become very heavy, and the shaft bearing 17 is designed to yield when subjected to a very heavy load of this type. The shaft 14 will then be moved in the direction indicated by the arrow 31 in FIG. 2, and the tooth 30 will then engage with a tooth 28 on the wheel 27, so that the shaft will be locked also at the end thereof opposite to the locking bar 26. Thus, when there is a very heavy load in the strap, a double-ended locking of the shaft will be provided, thus making the locking effect substantially stronger. In view of the double ended locking effect the load will be shared between the side walls 12 and 13, and so the side wall 13 will not have to withstand the applied load alone. Thus various parts of the retractor reel can be safely engineered to be weaker than would otherwise be the case, thus reducing the weight and the cost of materials of the retractor reel.

The bearing 16 at the opposite end of the shaft, i.e. at the end where the locking means 22, 23, 26 are positioned, is also yieldable when the load on the shaft 14 is heavy, but this is not a necessity.

Figure 3:
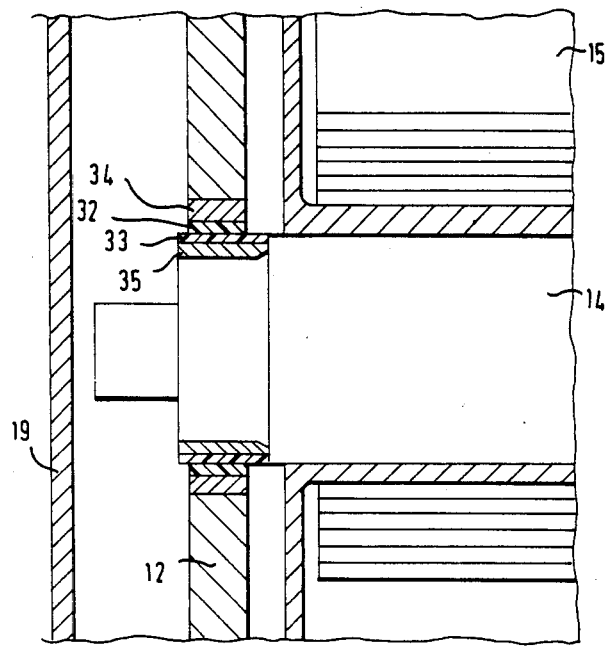
FIG. 3 is a view on an enlarged scale of the shaft bearing in a second embodiment of a retractor reel according to the invention, the shaft being supported in a bearing at a distance from the end surfaces.

The bearing means for the shaft 14 shown in FIG. 3 comprises two rings 32, 33 of plastics material. One ring 32 is mounted in a hole in the side wall 12 and the other ring 33 is attached to the shaft 14. The plastic ring 32 mounted in the side wall covers a plurality of teeth 34 formed on the side wall and projecting towards the shaft 14. The teeth are substantially evenly spaced along the periphery of the hole and are completely embedded in the plastic ring 32, so that the inner surface of the ring forms a smooth, cylindrical bearing surface. The ring 33 surrounds a rim of teeth 35, the teeth being formed on the shaft 14 and evenly spaced over the periphery of the shaft. The teeth 35 are completely embedded in the plastic ring 33, so that the outer surface of the ring forms a smooth, cylindrical bearing surface which is adapted to the bearing surface of the ring 32. The rings 32, 33 lie substantially in the plane of the side wall 12. Thus, the shaft 14 is rotatably mounted in the side wall 12 of the support by means of the plastic rings 32, 33, the bearing being positioned at some distance from the end surface of the shaft. The opposite end of the shaft is also rotatably mounted in the support, either by means of plastic rings or by means of a bearing penetrating into the end surface of the shaft, as present in the previously described embodiment of the invention. For the rest, the retractor reel shown in FIG. 3 is designed in the same way as the retractor reel shown in FIGS. 1 and 2.

The retractor reel shown in FIG. 3 operates in the following way. In normal use of the belt, the shaft 14 rotates in the bearing formed by the plastic rings 32, 33 in the side wall 12 of the suppport. In this case locking is provided in the way described above for the embodiment shown in FIGS. 1 and 2. In case of a very heavy load on the shaft 14, for example in a collision, the plastic rings break, because these rings can not take up the heavy loads that arise in such a case. When the plastic rings break, the teeth 34, 35 embedded in the plastic rings will engage with each other, so that further rotation of the shaft is prevented. At the other end of the shaft, the locking means 22, 23, 26 lock in the way described above, so that the shaft 14 will thus be locked at both ends.

The principle of design according to the invention set forth above can be used in all safety belt holders having single-ended locking of the shaft and will give an increase of strength of about 50 percent.

Whilst only two embodiments of the locking device according to the invention have been described and shown, it is obvious that many other embodiments and modifications are possible within the scope of invention. For example, the yieldable shaft bearings can be designed in other ways and can be positioned otherwise than shown on the drawings. The bearings can for example be formed by a projecting pin, and the outer plastic ring can be replaced by a yieldable disk of plastics or an other material, the disk being attached to the side wall. The teeth of the shaft may also consist of teeth notched into the shaft or of a separate gear ring attached to the shaft. The further locking means can also be positioned adjacent or at some distance from the yieldable bearing and can alternatively consist of friction or wedge surfaces. There is no need for two tooth wheels adjacent the side wall in the locking device for normal use, and one tooth wheel can be sufficient. The locking bar can also be designed in an other way and may be doubled, so that two locking bars are positioned diametrically with respect to the shaft, thus providing an improved capability of taking up forces. Alternatively, the locking bar can be replaced by a movable latch, and the locking bar or the latch can also be positioned in or on the rotatable shaft. The locking means provided with teeth at the other end of the shaft can also be designed in many different ways.

I claim:

1. A retractor reel for a vehicle safety belt comprising: a rotatable shaft with two ends; two shaft bearings, with each bearing rotatably supporting a respective end of the shaft; a support having two opposed walls, with the bearings being mounted on said walls; means for automatically winding the belt onto the shaft when the belt is not in use; a first locking means and a second co-operating locking means, one of the locking means being attached to the support and the other being attached to the rotatable shaft, one of the locking means being movable and arranged to be moved between an idle position, in which it does not engage with the other locking means, and an operative position, in which it engages with the other locking means for locking the shaft, said first and second locking means being positioned at one end of the rotatable shaft; the shaft bearing at the opposite end of the shaft is a yieldable bearing including at least one plastic ring which surrounds the opposite end of the rotatable shaft and which is adapted to yield when the shaft is heavily loaded; and two further co-operating locking means, with one of said further locking means being embedded within the yieldable bearing, with the other of said further locking means being positioned adjacent the yieldable bearing, and with said two further locking means being arranged to engage with each other to lock said opposite shaft end when the shaft bearing at said opposite end yields, with the result of that the shaft will become locked at both ends when heavily loaded.

2. A retractor reel according to claim 1, wherein: said two further locking means each comprises at least one tooth with the respective teeth being arranged to be able to engage with each other to lock the shaft; one of the further locking means is on the rotatable shaft; and the other further locking means is on the support.

3. A retractor reel according to claim 2, wherein one of the further locking means consists of a plurality of teeth on the rotatable shaft, and the other further locking means consists of at least one toothed positioned just outside the periphery of the toothed region of the shaft in the direction of belt withdrawal from the shaft.

4. A retractor reel according to claim 3, wherein the toothed region on the shaft is positioned in an opening in a wall of the support and lies substantially in the same plane as the wall.

5. A retractor reel according to claim 1, wherein the shaft bearing for said one end of the rotatable shaft is a yieldable bearing which is positioned on a resilient cover mounted on the support and which penetrates into the end of the rotatable shaft.

6. A retractor reel according to claim 1 wherein said one of said further locking means is embedded in said plastic ring which deforms under heavy load to enable the embedded said further locking means to engage the other of said further locking means.

7. A retractor reel according to claim 6 wherein said plastic ring is mounted on said rotatable shaft and said yieldable bearing includes a further plastic ring mounted on said support wall and surrounding said plastic ring mounted on said rotatable shaft.

8. A retractor reel according to claim 1 wherein: said yieldable bearing comprises two of said plastic rings, one of which is positioned on said support wall and the other of which is positioned on said rotatable shaft; one of said further locking means is embedded in one of said plastic rings and the other of said further locking rings is embedded in the other of said plastic rings; and said plastic rings are arranged to deform when said shaft is heavily loaded to permit said two further locking means to engage each other and lock said shaft.

9. A reactor reel according to claim 8 wherein said support wall is planar and said plastic rings are positioned substantially in the same plane as said wall.

10. A retractor reel according to claim 8 wherein each of said further locking means comprises a toothed wheel.

11. A retractor reel for a vehicle safety belt comprising: a rotatable shaft with two ends; two shaft bearings, with each bearing rotatably supporting a respective end of said shaft; a support having two opposed walls, with said bearings being mounted on said walls; means for automatically winding a safety belt onto said shaft when the belt is not in use; a first locking means and a second co-operating locking means, one of said locking means being attached to said support and the other being attached to said rotatable shaft, one of said locking means being movable and arranged to be moved between an idle position in which it does not engage with the other said locking means, and an operative position in which it engages with the other said locking means for locking said shaft, said first and second locking means being positioned at one end of said rotatable shaft; the shaft bearing at the opposite end of said shaft is adapted to yield when said shaft is heavily loaded and comprises two plastic rings which surround said opposite end of said rotatable shaft, one of said rings is positioned on the support wall and the other of said rings is positioned on the rotatable shaft; and two further locking means which are arranged to engage with each other to lock said opposite shaft end when the shaft bearing at said opposite end yields and which are embedded respectively in the plastic rings, which are arranged to yield and break when the shaft is heavily loaded, with the result of that the shaft will become locked at both ends when heavily loaded.

12. A retractor reel according to claim 11, wherein the support wall is planar and the plastic rings are positioned substantially in the same plane as the wall.

* * * * *